United States Patent [19]

Seifert et al.

[11] 4,442,800

[45] Apr. 17, 1984

[54] SINGLE DRUM ALL-WELDED BOILER

[75] Inventors: Thomas P. Seifert; Warren E. Longfield, both of Wadsworth, Ohio

[73] Assignee: The Babcock & Wilcox Company, New Orleans, La.

[21] Appl. No.: 374,358

[22] Filed: May 3, 1982

[51] Int. Cl.³ .............................................. F22B 37/18
[52] U.S. Cl. .................................... 122/379; 122/471; 122/472; 122/478
[58] Field of Search ............... 122/478, 472, 471, 365, 122/363, 343, 331, 336, 302, 299, 88, 163, 255, 256, 251, 259, 379

[56] References Cited

U.S. PATENT DOCUMENTS

| | | | |
|---|---|---|---|
| 2,758,574 | 8/1956 | Kuhner | 122/478 |
| 2,803,227 | 8/1957 | Marshall | 122/478 |
| 3,110,289 | 11/1963 | Armacost | 122/478 |
| 3,192,909 | 7/1965 | Richardson | 122/478 |
| 3,835,817 | 9/1974 | Tuomaala | 122/379 |
| 3,888,213 | 6/1975 | Akturk et al. | 122/478 |

Primary Examiner—Edward G. Favors
Attorney, Agent, or Firm—Robert C. Mai; Robert J. Edwards

[57] ABSTRACT

A single drum all-welded boiler system is disclosed for a furnace having a combustion chamber and a convection pass connected to the combustion chamber in a transition area, comprising a superheater in the transition area, an economizer in the convection pass and a boiler between the superheater and the economizer. The boiler and economizer can be made of a plurality of modules each comprising several tubes welded at the top to an outlet header and at the bottom to an inlet header.

8 Claims, 9 Drawing Figures

SINGLE DRUM ALL-WELDED BOILER

FIELD AND BACKGROUND OF THE INVENTION

The present invention relates, in general, to vapor generators, and, in particular, to a new and useful boiler system with a furnace which is adapted for burning, in addition to conventional fuel, municipal solid waste or kraft black liquor of the paper industry.

Such boiler systems may include a superheater and an economizer in a convection pass downstream of a combustion chamber. An additional boiler assembly may also be provided between the superheater and the economizer. It is known to provide a plurality of steam and water drums, which, in particular, are connected to steam generating tubes for receiving a steam/water mixture and separating the mixture into a steam supply and a water supply.

Particular problems occur when dealing with boiler systems for burning kraft liquors and solid waste, in that, inordinate amounts of soot and other impurities are generated which tend to foul heat transfer tubing of the superheaters, boilers and economizers.

Particularly in view of rising energy costs, it has become increasingly interesting to utilize such wastes to generate steam. This interest has resulted in the demand for higher steam pressures and temperatures with extended superheater control ranges.

In addition to the fouling problems in burning kraft liquors, water can leak into the smelt bed formed at the bottom of the furnace chamber which can cause severe explosion and fire problems due to smelt-water reactions. Close quality control is thus required in the manufacture and construction of pressure parts for such boiler systems.

Another problem arises, in particular, with the burning of municipal solid wastes, in that excess soot and ash material must be dislodged from tubes of heat transfer surface.

SUMMARY OF THE INVENTION

An object of the present invention is to provide a boiler system and a furnace which has various improved characteristics and is particularly suited for the burning of waste fuels such as municipal solid waste and kraft liquors.

According to the invention, a single steam drum is utilized which, in addition, can be positioned out of high temperature areas of the system, and thus be exposed to less dangerous environment.

In addition, the use of a single drum facilitates the shop assembly of welded tube modules for the boiler and/or economizer of the steam generating unit. This reduces on-site work necessary in erecting the facility. This is contrasted to the prior art where tubes are expanded at the top and bottom to separate steam and water drums which, themselves, are in the hot gas stream.

According to the invention, a single drum has forged steel connections which do not require rolling and seal welding which is required in the prior art connection of steam and water drums to heat transfer tubes.

According to the invention, the superheater is designed with multiple steam flow paths with high steam mass flow to provide protection against overheating of the tubes. The smaller boiler module cross-section also permits extension of the superheater surface into areas previously occupied by the type of boiler banks utilizing two steam and water drums.

According to the invention, the boiler and economizer modules are designed for the upflow of fluid at all times. The ends of the lower header of the boiler module, according to the invention, are provided with flanged sections which permit examination for potential deposition of contaminants in the saturated water circuit. The prior art two-drum designs are based on a downflow of water in several of the rear boiler tube rows which act as downcomers and an upflow in the remaining tube sections.

An improved arch construction in the furnace chamber is also provided in the upper region of the furnace and below the superheater.

According to another feature of the invention, the superheater tubes are provided with a rapper for dislodging soot and ash from the tubes, with the advantageous retention of a small amount of ash to reduce corrosion of the tubes.

Accordingly, an object of the invention is to provide a single drum boiler system and a furnace having a combustion chamber and a convection pass connected through a transition area to the combustion chamber, comprising, a superheater disposed in the transition area, an economizer disposed in the convection pass and a single steam drum having inlets and outlets connected to the economizer and superheater.

Another object of the invention is to provide a boiler tube assembly between the economizer and the superheater in the convection pass with both the boiler and economizer being fed from below for an upward flow of fluid therethrough.

A still further object of the invention is to provide an arch member in the combustion chamber for improved gas flow and temperature distribution entering the superheater.

An additional object of the invention is to provide for elongated vertical heat transfer surface to facilitate cleaning and disposal of deposits.

DESCRIPTION OF THE PREFERRED EMBODIMENTS

Figure 1:
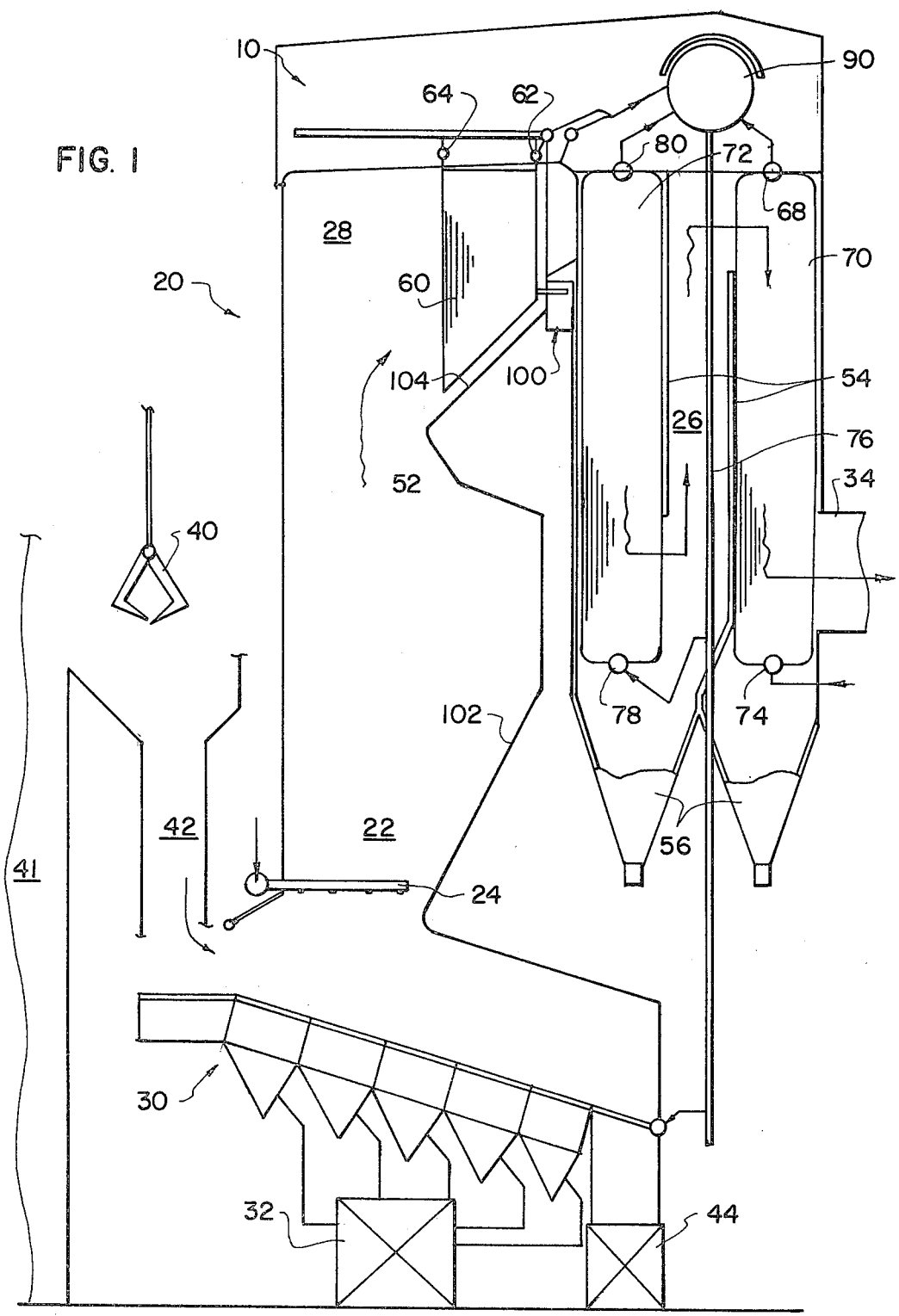
FIG. 1 is an outline of a one-drum boiler system according to the invention.

Referring to the drawings, in particular, the invention embodied in FIG. 1, comprises a one drum boiler system generally designated 10 and a furnace generally designated 20. Furnace 20 includes combustion means 30 which is adapted for burning various fuels. In the embodiment shown, municipal solid waste can be burned which is supplied, for example, by a grapple 40 which transfers municipal solid waste from a bin 41 into a chute 42 wherefrom it is transferred to a stoker 30. Stoker 30 is provided, in known fashion, with air supply means 32 for igniting and burning the waste. Furnace 20 includes a combustion chamber 22 having a lower end which receives overfire air by supply means 24. Convection pass 26 includes an exhaust gas outlet 34 which, in known fashion, may be connected to pollution control equipment and/or a stack.

In the case where municipal solid waste is to be burned, the furnace also includes a quenching basin 44 which receives molten unburned material.

Hot gases produced in combustion chamber 22 rise in the direction of arrow 52 through the transition area 28 and into the convection pass 26. In the embodiment shown, the convection pass includes a plurality of baffle walls 54 for directing the exhaust gases in a serpentine path through the convection pass. Thus, collection hoppers 56 may be provided for collecting soot at the bottom of convection pass 26.

The boiler system incluces an economizer 70 disposed in the convection pass 26. Water is supplied to the bottom inlet header 74 of the economizer 70. The economizer 70 comprises a module of heat transfer tubes which will be described later in greater detail. Water flow is upward through the tubes to outlet header 68 and thence to drum 90.

Water from drum 90 is fed through downcomer 76 to supply the lower furnace wall headers and to supply boiler module 72 through lower header 78. Fluid flow is upward through the tubes to upper header 80 and thence to drum 90.

Figure 1A:
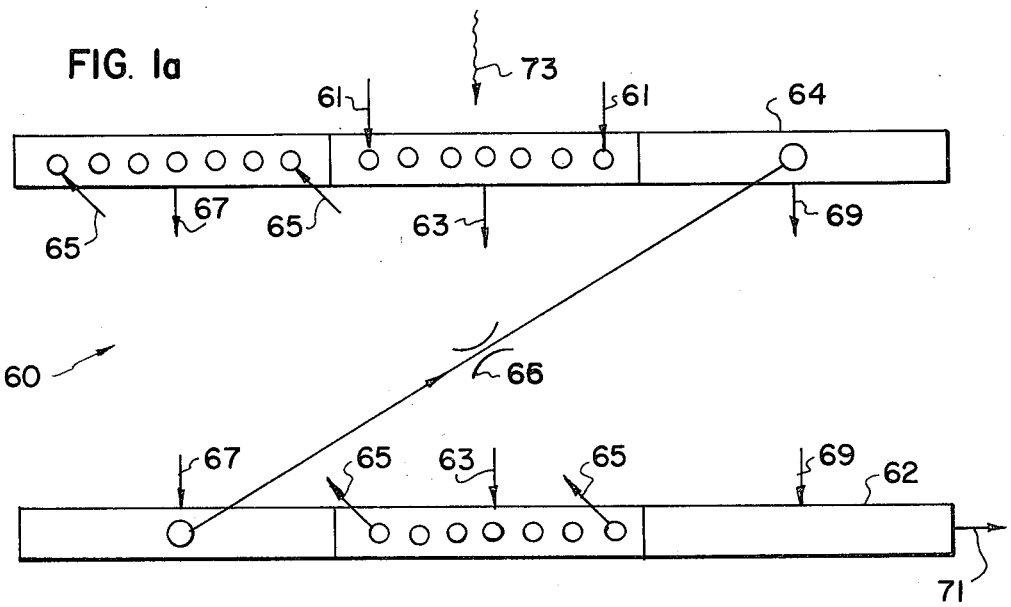
FIG. 1a is a schematic top view showing the steam flow path of the superheater used in the embodiment of FIG. 1.

According to the invention, the boiler system 10 also comprises a superheater 60 composed of multiple tube sections interconnecting front and rear headers 64 and 62 respectively. Referring to FIG. 1a, steam enters the center section of front header 64 through multiple connections 61 from steam drum 90. Steam then flows rearward, as indicated by arrows 63, in the direction of gas flow which is indicated by arrow 73 and enters the center section of rear header 62. Multiple external connections 65 then conduct the steam to a side section of front header 64 from which the flow is again rearward as indicated by arrows 67, entering a side section of rear header 62. Flow is then through external piping to attemperator 66 and then to an opposite side section of front header 64. Flow then is again rearward as indicated by arrows 69 to rear header 62 from whence it exits to a point of use as indicated by arrow 71.

Referring again to FIG. 1, means 100 are provided for rapping the tubes of superheater 60 to free the tubes of undesirable deposits. Such rapping means are advantageous particularly where municipal solid waste is to be burned due to its high content of impurities. Rapper means 100 are more fully described later.

According to another feature of the invention, combustion chamber 22 of furnace 20 is provided with a first arch structure 102 to improve combustion characteristics in the zone immediately above the stoker 30. A second arch structure 104 is also provided in the transition area 28 below the superheater 60 for improved gas flow and gas temperature distribution through the superheater. In addition to the fact that only a single steam drum 90 is used, the invention is distinct from prior approaches to furnace and boiler design of this type, in that no superheater screen is provided in the combustion chamber.

The long flow economizer 70 and boiler generating modules 72 are unique in application to a unit designed for municipal solid waste disposal. Moreover, the large furnace 20 eliminates the need of screen tubes or boiler surface ahead of the superheater.

The positioning of the steam drum 90 in a remote area above the convection pass and not exposed to combustion gas flow also permits the use of all-welded shop assembled modular tube arrangements for economizer 70 and generating bank 72.

Figure 6:
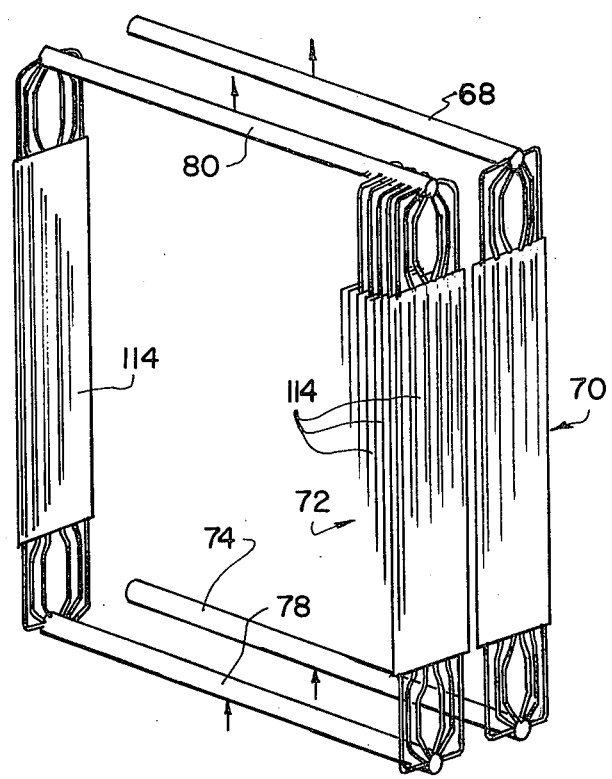
FIG. 6 is a perspective view showing tube modules used for the economizer and boiler of the invention.

Referring to FIG. 6, economizer module 70 and boiler generating module 72 are of duplicate design. The tubes 114 are 2 inches in outside diameter and are welded to both top and bottom headers. The vertical run of tubes 114 have a back spacing of 7½ inches and 2½ inch wide fins are welded on each side of tubes along the vertical run with a ½ inch gap between fins. Any desired number of duplicate modules can be provided in the appropriate part of the convection pass, to provide a boiler bank or economizer as needed to suit job requirements.

Figure 3:
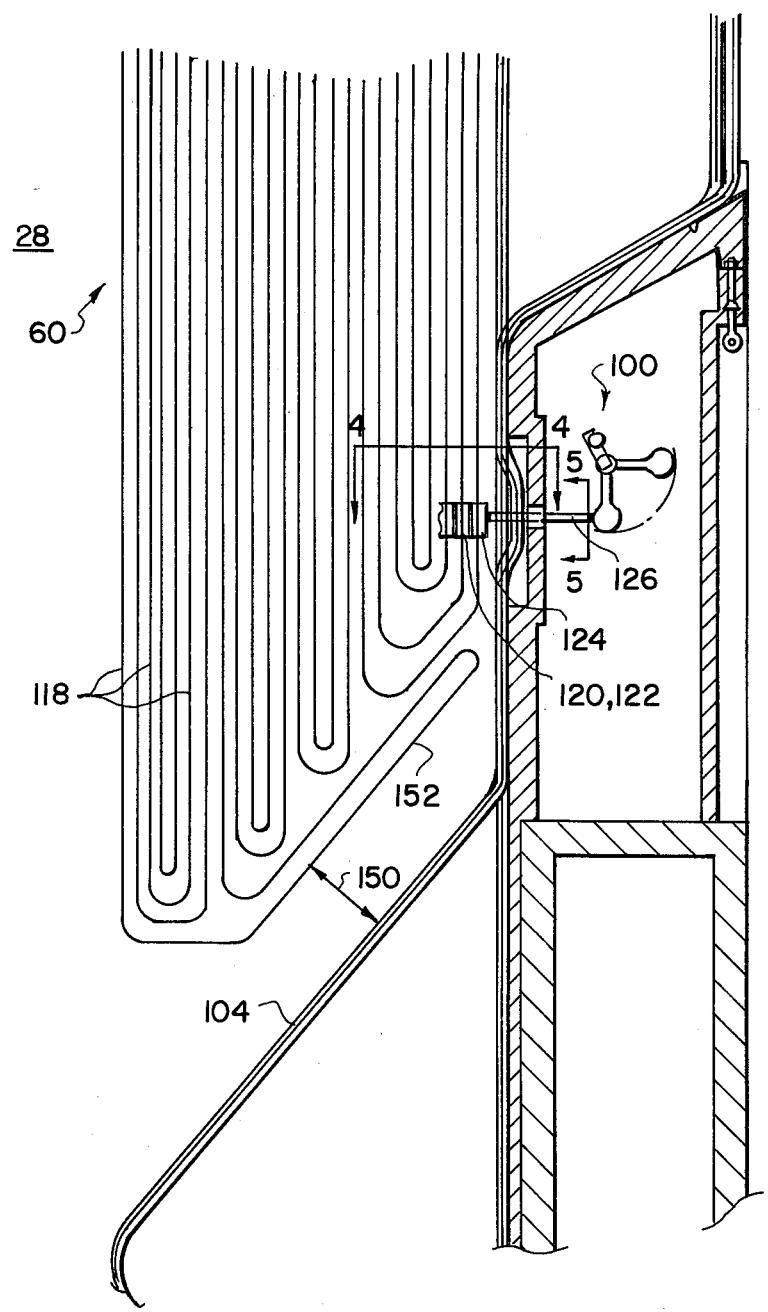
FIG. 3 is a partial side view of the superheater showing rapper means used to dislodge soot and ash according to the invention.
Figure 4:
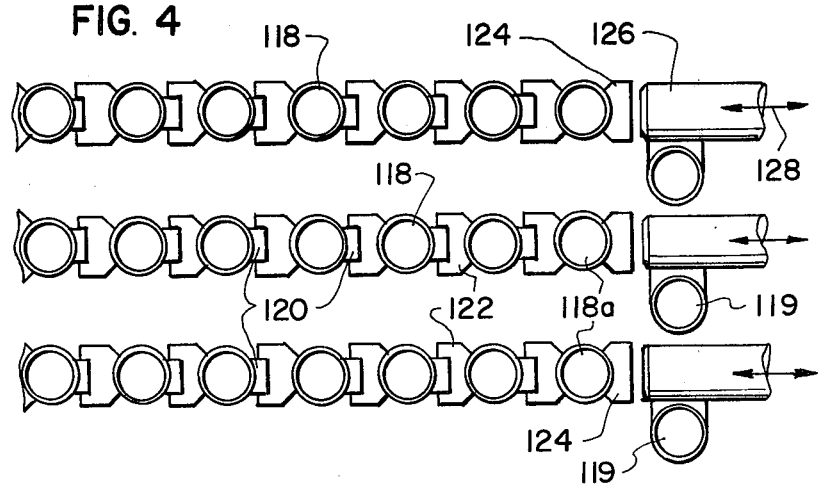
FIG. 4 is a plan view of the rapper device along line 4—4 of FIG. 3.
Figure 5:
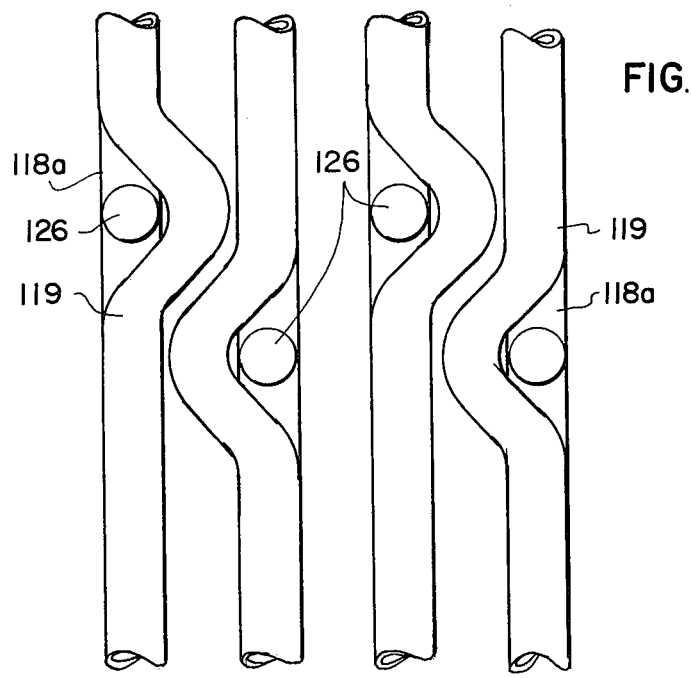
FIG. 5 is a rear view of the rapper device along the line 5—5 of FIG. 3.

Referring now to FIGS. 3, 4, and 5, the superheater tube rapper 100 details are illustrated. Near the lower end of superheater 60, only part of which is shown in FIG. 3, rows of tubes 118 are provided with aligned lugs 120, 122, only one pair being illustrated. As best shown in FIG. 4, each tube 118 includes a rearwardly facing lug 120 and a forwardly facing lug 122. Each rearwardly facing lug 120 of one tube 18 is engaged with and abuts a forwardly facing lug 122 of an adjacent tube 118. On the rearmost tube 118a, an impact body 124 is provided which is larger than the lugs 120, 122 and adapted to receive an impact from a ram 126. Each row of tubes 118 is provided with its own set of lugs and impact body, with the lugs and impact bodies of one row offset in a vertical direction with respect to those of an adjacent row to facilitate the rapping of every row of tubes. An outer and thus accessible set of tubes 119 is provided without bosses or an impact body and is curved, as shown in FIG. 5, to expose the underlying impact bodies to the rams 126. Rams 126 can be reciprocated in the direction of arrows 128 to impact body 124 by any suitable means as illustrated and described in connection with FIG. 7. According to the invention, the rams 126 are provided access from the rear of the superheater 60. It has been found that the use of a rapping operation to dislodge soot and foreign matter from tubes 118 advantageously leaves a thin film of ash on the tubes which acts as a corrosion resisting agent.

Referring again to FIG. 3, another innovation in design of this steam generating unit is the unusual superheater circuitry wherein one loop, 152, is extended rearward over the full depth of the superheater to maintain the tubes in alignment through proper ties, not shown, during the rapping operation. Adequate space 150 is provided between superheater 60 and arch tubes 104 to allow for falling ash after rapping and downward disposal to stoker 30. A feature that should be noted is that the furnace arch 104 and the arrangement of the superheater eliminate gas by-passing the superheater surface notwithstanding the large space 150 below the superheater.

Figure 7:
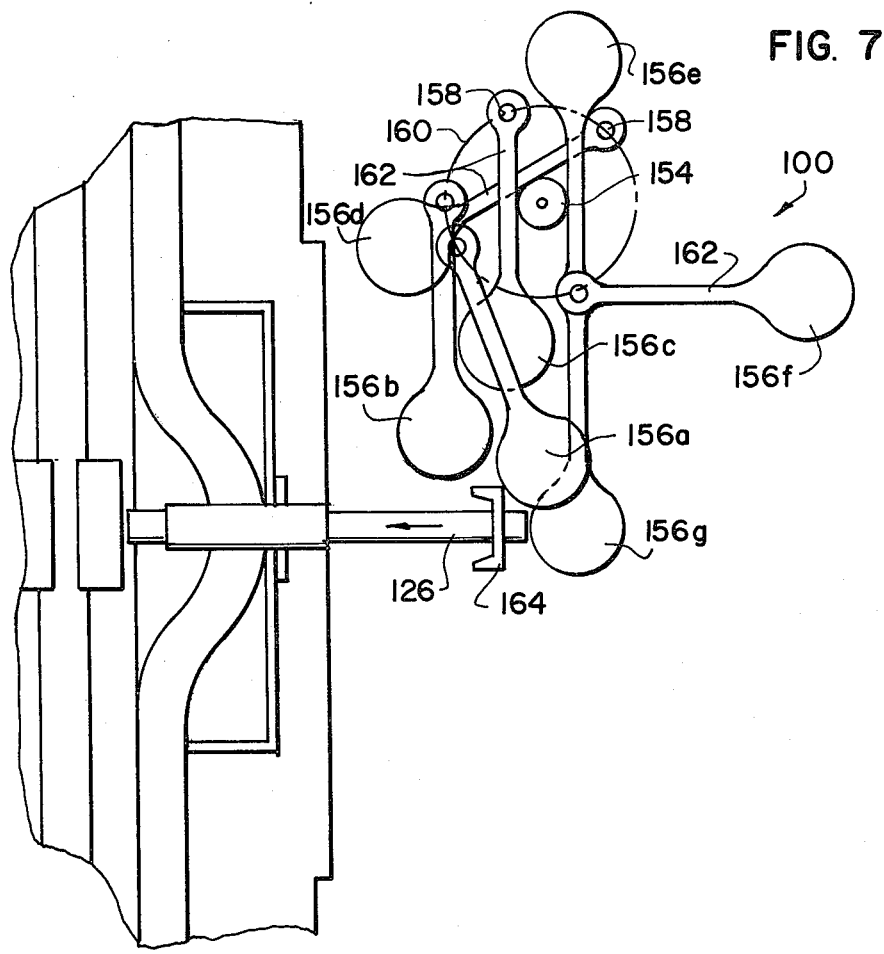
FIG. 7 is an enlarged side elevational view showing a preferred embodiment of the rapper device according to the invention.

Referring to FIG. 7, the rapper 100 comprises a shaft 154 which can be rotated relatively slowly and which carries one or more hammers 156. Each hammer 156 is connected at a pivot connection 158 to an arm connected to shaft 154. With rotation of shaft 154, the pivot connection 158 moves in a circular path 160. Each hammer, having a hammer arm 162, moves sequentially into the positions 156a through 156g. At position 156g, the hammer has just struck a ram 126. At position 156a, the hammer passes a support 164 which slidable receives ram 126. In positions 156b and 156c, the hammer hangs free. In position 156d, the hammer is rotated, with the aid of its arm 162, about and over the top of shaft 154. At position 156f, the hammer is shown in free fall an instant before it strikes ram 126.

Figure 2:
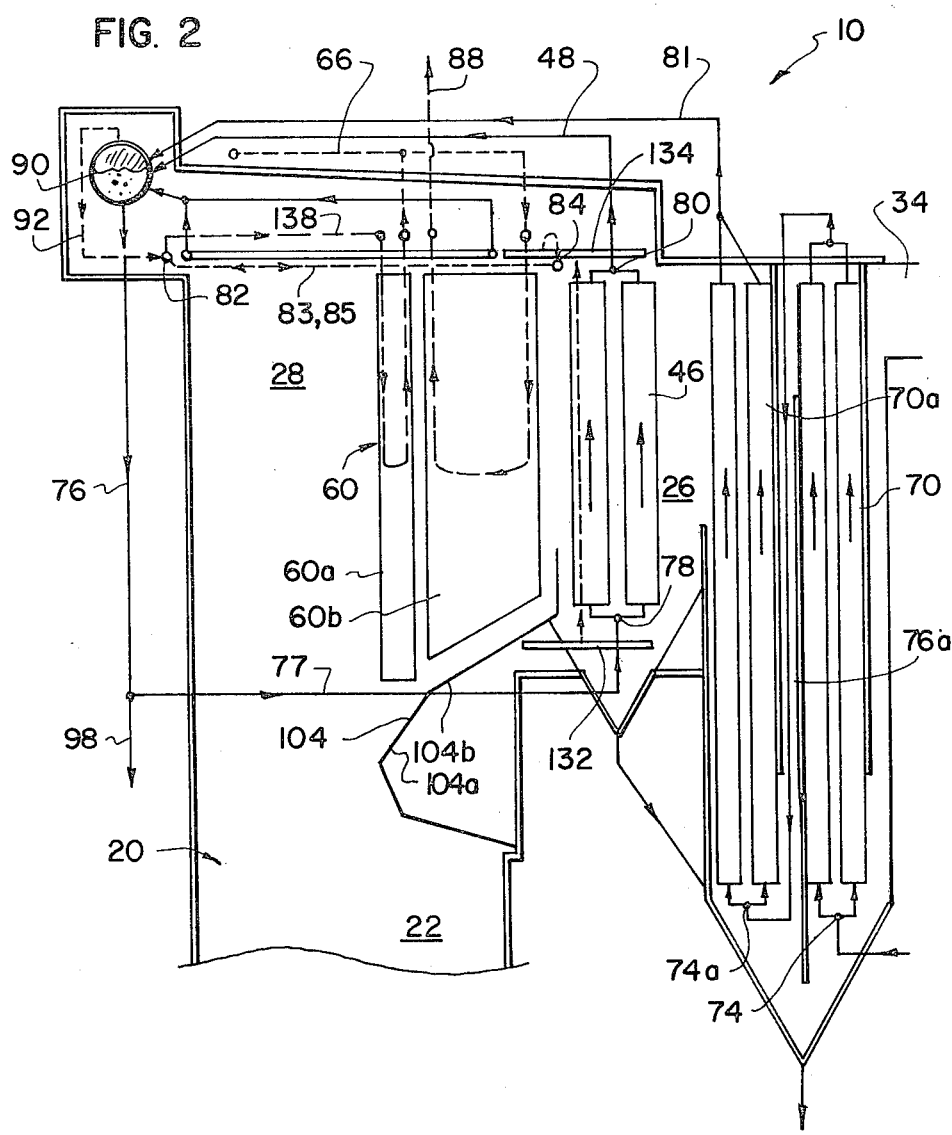
FIG. 2 is a view similar to FIG. 1 of a different embodiment of the invention.
Figure 2A:
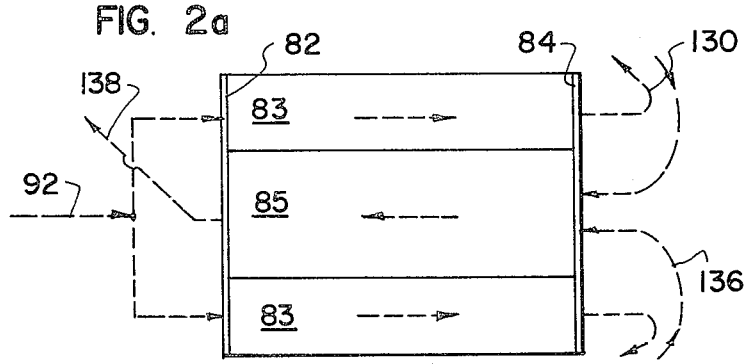
FIG. 2a is a schematic top view of the roof tube arrangement used in the embodiment of FIG. 2.

Referring now to FIGS. 2 and 2a, where similar reference numerals are utilized to designate similar parts, a boiler system is partially shown for a kraft recovery unit which burns kraft liquor as fuel. The lower furnace for burning kraft liquor, is similar to the unit shown and described in U.S. Pat. No. 2,893,829, J. E. Hutton, also assigned to the assignee of this invention. The unit is also adaptable for use as a power boiler burning coal, gas or oil with modifications to the lower furnace. Such units are used in the pulp and paper industry for the generaton of steam used in the pulping process. As with the municipal solid waste burning furnaces, the kraft recovery unit of FIG. 2 requires special considerations.

For ease of understanding, solid lines are utilized to designate the flow paths of water or a water/steam mixture, and dotted lines are utilized to designate the flow of steam. FIG. 2a is a schematic top view of the roof tubes of the furnace.

Economizer inlet header 74 supplies water to the bottom of first stage economizer 70. Water flow is upward in the module then downward through external lines 76a to the lower header 74a of the second stage economizer 70a. Water flow is again upward in the module and then through line 81 to steam drum 90.

Water is supplied from steam drum 90 to two downcomers 76, only one of which is shown. The downcomers 76 supply water through line 77 to the lower header of boiler modules 46 which are disposed in the convection pass 26 between superheater 60 and economizers 70 and 70a. Fluid flow is upward in the boiler modules 46 and a is delivered over line 48 to steam drum 90. As shown by arrow 98, water is also provided to the lower wall headers of the furnace (not shown). Water and steam rise through the furnace walls and are discharged to upper wall headers and thence through risers to steam drum 90.

Steam flows from the drum 90 through saturated connections 92 to front roof header 82. As more clearly shown in FIG. 2a, steam flow is then rearward via both outside one-quarter of roof tubes 83 to rear roof header 84. From roof header 84 flow is then downward via external connections 130 to lower side wall headers 132. Steam flow is upward through the side wall tubes to upper side wall headers 134. Flow is then supplied through external connections 136 to the center of rear roof header 84. Steam then flows forward in the center one-half of roof tubes 85 back to front roof header 82.

Referring again to FIG. 2, steam is supplied to primary superheater 60a from the center of front roof header 82 through connecting tubes 138. From primary superheater 60a the steam flow paths is through the attemperator 66 and then through secondary superheater 60b, exiting through line 88 to a point of use.

The boiler and economizer modules can be arranged as single or multiple units. The features of permitting the use of any required number of modules and the ability to vary the division between boiler and economizer heating surface gives the designer new flexibility—it permits of optimizing the surface division as a function of operating pressure and avoids an undesirable steaming economizer.

As with the embodiment of FIG. 1, the economizer and boiler consist of shop-assembled, welded modules as illustrated in FIG. 6.

According to another improvement of the invention, the arch member 104, for the superheaters, is designed with an upstream section 104a which has been found to be advantage about 50° to the horizontal and a downstream section 104b which also has been advantage at about 30° to the horizontal for gas flow and temperature distribution through superheater 60.

While individual components of this furnace and boiler system as described herein may be known in analogous forms in the prior art, the unique combination and design of these components as disclosed provide novelty and inventive concept resulting in an advancement of the art.

While specific embodiments of the invention have been shown and described in detail to illustrate the application of the principles of th invention, it will be understood that the invention may be embodied otherwise without departing from such principles.

The embodiments of the invention in which an exclusive property or privilege is claimed are defined as follows:

1. A single drum all-welded boiler system for a furnace having a combustion chamber and a convection pass downstream of the combustion chamber and connected to the combustion chamber in a transition area, comprising:
   a superheater disposed in the transition area having an inlet and an outlet;
   an economizer disposed in the convection pass having an inlet and an outlet;
   a boiler disposed in said convection pass between said economizer and said superheater, said boiler comprising at least one modular unit made up of a plurality of tubes welded at the bottom to a common inlet header and at the top to a common outlet header, wherein the boiler and economizer modular units have extended surface in the form of fins welded on each side of the tubes parallel to the direction of gas flow and have vertical upward flow of fluid in the tubes; a plurality of unheated downcomer pipes, not exposed to combustion gas, extending vertically downward from a single steam drum to supply water to the lower furnace wall headers and to the lower headers of the boiler modules; and
   said single steam drum having at least one inlet connected to said economizer outlet and at least one outlet connected to said superheater inlet; the drum located in an area not exposed to combustion gas flow.

2. A system according to claim 1, wherein said convection pass is elongated in the vertical direction, said economizer comprising a plurality of vertically extending tubes between said economizer inlet and outlet, said economizer being elongated in the vertical direction.

3. A single drum all-welded boiler system for a furnace having a combustion chamber and a convection pass downstream of the combustion chamber and connected to the combustion chamber in a transition area, comprising;
 a superheater disposed in the transition area having an inlet and an outlet;
 an economizer disposed in the convection pass having an inlet and an outlet;
 a single steam drum having at least one inlet connected to said economizer outlet and at least one outlet connected to said superheater inlet, the drum located in an area not exposed to combustion gas flow, wherein said superheater comprises a plurality of vertically extending tubes, said system including rapper means for applying impacts to said superheater tubes, and wherein said superheater tubes are arranged in a plurality of aligned rows, said rapper means comprising lugs connected to each tube of each row for engaging each tube of each row, an impact member at one end of each row, and a ram movable to strike each impact member.

4. A single drum all-welded boiler sytem for a furnace having a combustion chamber and a convection pass downstream of the combustion chamber and connected to the combustion chamber in a transition area, comprising;
 a superheater disposed in the transition area having an inlet and an outlet;
 an economizer disposed in the convection pass having an inlet and an outlet;
 a single steam drum having at least one inlet connected to said economizer outlet and at least one outlet connected to said superheater inlet, the drum located in an area not exposed to combustion gas flow,
wherein said superheater comprises a plurality of vertically extending tubes, said system including rapper means for applying impacts to said superheater tubes, wherein said superheater tubes are arranged in a plurality of aligned rows, said rapper means comprising lugs connected to each tube of each row for engaging each tube of each row, an impact member at one end of each row, and a ram movable to strike each impact member, and wherein each row is aligned in a flow direction in said transition area, each impact member positioned on a downstream end of each row in said flow direction, each ram positioned at a downstream end of said transition area for striking each impact member.

5. A system according to claim 1, wherein the combustion chamber includes an arch member extending into the combustion chamber immediately below said transition area, said superheater disposed above said arch member, and wherein said arch member includes a first downstream portion in a direction of gas flow in said transition area disposed at an angle of about 30 degrees to the horizontal, and an upstream portion connected to said downstream portion disposed at an angle of about 50 degrees to the horizontal.

6. A system according to claim 1, including a plurality of roof tubes extending over the top of the combustion chamber and the transition area, said tubes extending from a front header spaced from said convection pass to a rear header adjacent said convection pass, said boiler system including side walls having a lower header and an upper header, said front and rear headers divided into a plurality of sections, an outlet of said steam drum for providing steam connected to at least one of said front header sections, at least one of said rear header sections connected to said lower side wall header, said upper side wall header connected to at least one other rear header section, and at least one other front header section connected to said superheater inlet.

7. A system according to claim 6, wherein said roof tubes are divided into three groups, a central group comprising about one-half of the tubes and two outer groups each comprising about one-quarter of the tubes.

8. A system according to claim 1, wherein the boiler and economizer modular units are duplicates of each other.

* * * * *